(12) United States Patent
Prediger et al.

(10) Patent No.: US 12,419,212 B2
(45) Date of Patent: Sep. 23, 2025

(54) FLOW SPLITTER AND AGRICULTURAL IMPLEMENTS HAVING FLOW SPLITTERS

(71) Applicant: AGCO do Brasil Soluções Agrícolas Ltda., Ribeirao Preto (BR)

(72) Inventors: Ilsemar Prediger, Ibirubá (BR); Jarlis Luiz Matter, Ibirubá (BR); Venicius Damo Cunha, Ibirubá (BR)

(73) Assignee: AGCO do Brasil Soluções Agrícolas Ltda., Jundiai (BR)

( * ) Notice: Subject to any disclaimer, the term of this patent is extended or adjusted under 35 U.S.C. 154(b) by 553 days.

(21) Appl. No.: 17/931,296

(22) Filed: Sep. 12, 2022

(65) Prior Publication Data

US 2023/0117204 A1  Apr. 20, 2023

(30) Foreign Application Priority Data

Oct. 14, 2021  (GB) ...................................... 2114669

(51) Int. Cl.
  *A01C 7/08*  (2006.01)
  *A01C 7/10*  (2006.01)
  *A01C 15/00*  (2006.01)

(52) U.S. Cl.
  CPC .............. *A01C 7/082* (2013.01); *A01C 7/102* (2013.01); *A01C 15/006* (2013.01)

(58) Field of Classification Search
  CPC ................................ A01C 7/082; A01C 7/102
  See application file for complete search history.

(56) References Cited

U.S. PATENT DOCUMENTS

| | | | |
|---|---|---|---|
| D894,240 S * | 8/2020 | Montag | D15/28 |
| 12,089,528 B2 * | 9/2024 | Johnson | A01C 7/082 |
| 2011/0311322 A1 * | 12/2011 | Jost | B65G 53/528 |
| | | | 406/181 |
| 2018/0242516 A1 * | 8/2018 | Roberge | A01C 7/206 |

(Continued)

FOREIGN PATENT DOCUMENTS

WO  WO-2019036523 A1 *  2/2019

OTHER PUBLICATIONS

Mullen, C.A.; Ellison, C.; Elkasabi, Y. Pyrolytic Conversion of Cellulosic Pulps from "Lignin-First" Biomass Fractionation. Energies 2023, 16, 3236. https://doi.org/10.3390/en16073236 (Year: 2023).*

(Continued)

*Primary Examiner* — Theodore N Yao

(57) ABSTRACT

A flow splitter includes a body having a generally cylindrical main passage therethrough oriented along a longitudinal axis of the body. The main passage connects an inlet at the upstream end to exactly three split passages adjacent the downstream end, each split passage connected to a corresponding outlet. A first and second of the three split passages are oriented along axes that intersect one another at a first acute angle in a common plane with the longitudinal axis. A third of the three split passages intersects the common plane at a second acute angle. An agricultural implement includes a frame, a toolbar carried by the frame and supporting a plurality of row units, a hopper carried by the frame, a primary flow line connecting the hopper to a flow splitter, and three secondary flow lines connecting the flow splitter to three of the row units.

19 Claims, 6 Drawing Sheets

(56) References Cited

U.S. PATENT DOCUMENTS

| | | |
|---|---|---|
| 2018/0343792 A1 | 12/2018 | Roberge et al. |
| 2020/0053955 A1 | 2/2020 | Borkgren et al. |
| 2020/0221631 A1* | 7/2020 | Setterdahl ............... A01C 7/20 |
| 2021/0282313 A1 | 9/2021 | Ruppert et al. |

OTHER PUBLICATIONS

Candice Ellison, et al (2018) Dielectric characterization of bentonite clay at various moisture contents and with mixtures of biomass in the microwave spectrum, Journal of Microwave Power and Electromagnetic Energy, 52:1, 3-15, DOI: 10.1080/08327823.2017. 1421407 (Year: 2018).*

UK Intellectual Property Office, Search report for related UK Application No. GB2114669. I, dated Jun. 9, 2022, 4 pages.

European Patent Office, Search Report related to European Patent Application No. EP22195064.5, mail date Mar. 6, 2023, 11 pages.

* cited by examiner

FLOW SPLITTER AND AGRICULTURAL IMPLEMENTS HAVING FLOW SPLITTERS

CROSS-REFERENCE TO RELATED APPLICATION

This application claims the benefit of the filing date of U.K. Patent Application GB2114669.1, "Flow Splitter and Agricultural Implements Having Flow Splitters," filed Oct. 14, 2021, the entire disclosure of which is incorporated herein by reference.

FIELD

Embodiments of the present disclosure relate generally to solid material flow systems for agricultural implements, and in particular, implements having row units for working fields in rows.

BACKGROUND

Agricultural implements with a plurality of row units are used to plant seeds and/or dispense fertilizer upon or in the ground. Pull-type implements may have a central portion pulled by a tractor, and may have wings extending from either side. The individual row units, mounted to the center section or to a wing, typically deliver seeds or fertilizer into separate rows. The row units may receive seed from a common hopper. Each row unit may contain one or more mini hoppers that are configured to be supplied with material from the common hopper. Flow lines connect the common hopper to the row units.

BRIEF SUMMARY

In one embodiment, a flow splitter includes a body having a generally cylindrical main passage therethrough oriented along a longitudinal axis of the body. The body has an upstream end and a downstream end. The main passage connects an inlet at the upstream end to exactly three split passages adjacent the downstream end, each split passage connected to a corresponding outlet. A first and second of the three split passages are oriented along axes that intersect one another at a first acute angle in a common plane with the longitudinal axis. A third of the three split passages intersects the common plane at a second acute angle.

The flow splitter may have exactly three split passages, and exactly three outlets. The inlet may have a first inner diameter, and each of the outlets may have a common second inner diameter smaller than the first inner diameter.

The first acute angle may be, for example, between 5° and 89°, such as between 20° and 70°.

The second acute angle may be between 5° and 89°, such as between 20° and 70°.

The body may comprise a first portion and a second portion connected by at least one fastener. In such embodiments, the first portion may define the first of the three split passages, the second portion may define the second of the three split passages, and the first and second portion d together may define the main passage and the third of the three split passages. In another embodiment, the first portion defines the third of the three split passages, the second portion defines the first and second of the three split passages, and the first portion and the second portion together define the main passage.

The flow splitter may comprise a mount configured to secure the body to a toolbar.

An agricultural implement includes a frame, a toolbar carried by the frame and supporting a plurality of row units, a hopper carried by the frame, a primary flow line connecting the hopper to a flow splitter, and three secondary flow lines connecting the flow splitter to three of the row units.

The flow splitter may be secured to the implement such that the common plane is oriented at an angle between 0° and 70°, such as between 40° and 50°, relative to a surface of ground under the agricultural implement when the implement works the ground.

The flow splitter may be oriented such that material flows vertically upward out of each of the first outlet, the second outlet, and the third outlet.

The frame of the agricultural implement may comprise a first section and at least one wing section hingedly coupled to the first section, and the flow splitter may be carried by the at least one wing section.

The toolbar may be supported by at least one wheel.

Each of the row units may be configured to receive solid material from the hopper and dispense the solid material to an agricultural field. The row units may comprise planter row units and/or fertilizer row units.

BRIEF DESCRIPTION OF THE DRAWINGS

While the specification concludes with claims particularly pointing out and distinctly claiming what are regarded as embodiments of the present disclosure, various features and advantages may be more readily ascertained from the following description of example embodiments when read in conjunction with the accompanying drawings, in which:

DETAILED DESCRIPTION

The illustrations presented herein are not actual views of any agricultural implement or portion thereof, but are merely idealized representations to describe example embodiments of the present disclosure. Additionally, elements common between figures may retain the same numerical designation.

The following description provides specific details of embodiments. However, a person of ordinary skill in the art will understand that the embodiments of the disclosure may be practiced without employing many such specific details.

Indeed, the embodiments of the disclosure may be practiced in conjunction with conventional techniques employed in the industry. In addition, the description provided below does not include all elements to form a complete structure or assembly. Only those structures necessary to understand the embodiments of the disclosure are described in detail below. Additional conventional structures may be used. The drawings accompanying the application are for illustrative purposes only, and are thus not drawn to scale.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof.

As used herein, the term "may" with respect to a material, structure, feature, or method act indicates that such is contemplated for use in implementation of an embodiment of the disclosure, and such term is used in preference to the more restrictive term "is" so as to avoid any implication that other, compatible materials, structures, features, and methods usable in combination therewith should or must be excluded.

As used herein, the term "configured" refers to a size, shape, material composition, and arrangement of one or more of at least one structure and at least one apparatus facilitating operation of one or more of the structure and the apparatus in a predetermined way.

As used herein, the singular forms following "a," "an," and "the" are intended to include the plural forms as well, unless the context clearly indicates otherwise.

As used herein, the term "and/or" includes any and all combinations of one or more of the associated listed items.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures.

Figure 1:
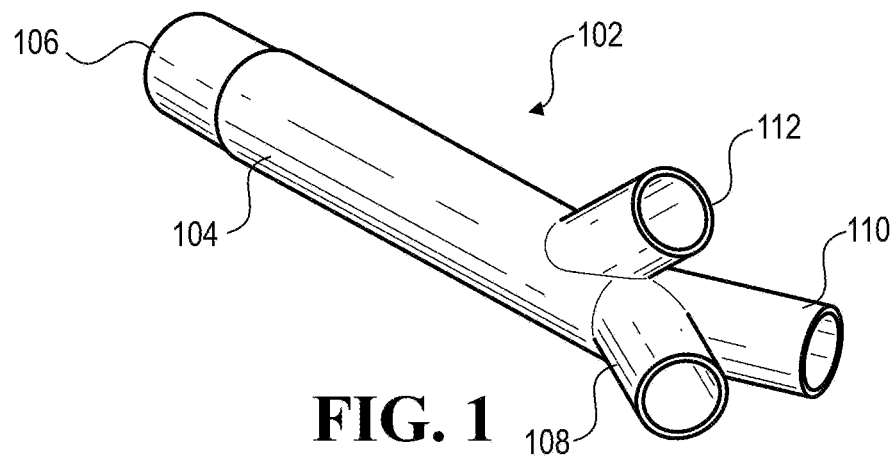
FIG. 1 is a simplified perspective view of a flow splitter.
Figure 2:
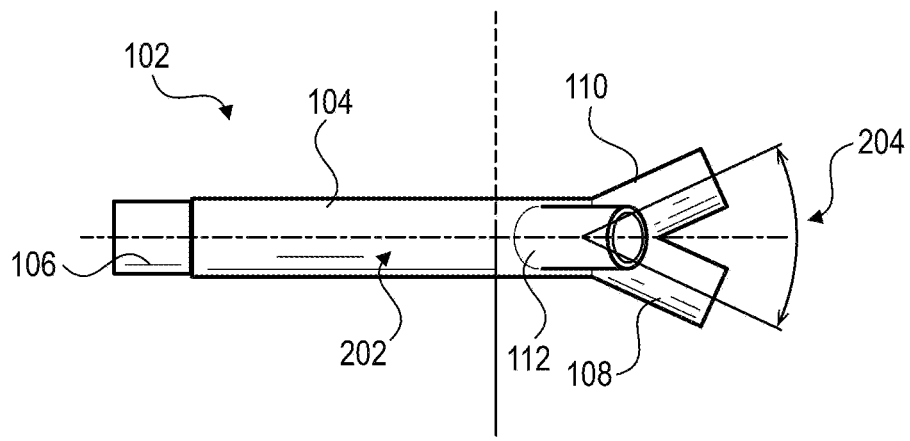
FIG. 2 is a simplified top view of the flow splitter shown in FIG. 1.
Figure 3:
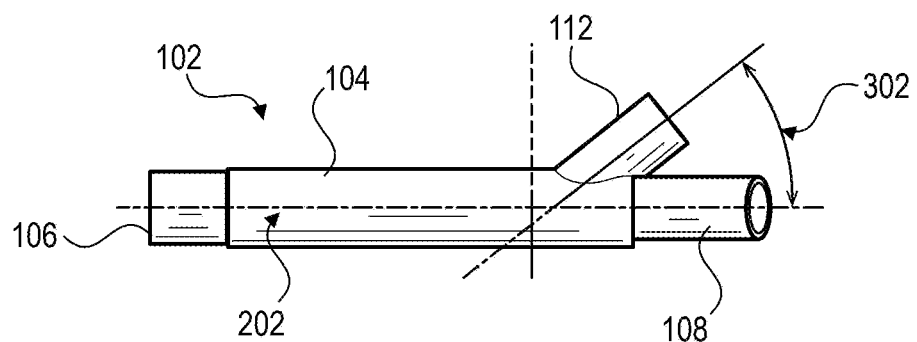
FIG. 3 is a simplified side view of the flow splitter shown in FIG. 1.

FIG. 1 is a simplified perspective view of a flow splitter 102 that may be used to supply solid material from a central hopper of an agricultural implement to a row unit. FIG. 2 is a simplified top view of the flow splitter 102, and FIG. 3 is a simplified side view of the flow splitter 102.

As best seen in FIG. 1, the flow splitter 102 has a body 104, which has a generally cylindrical main passage therethrough and having an upstream end and a downstream end. The main passage connects an inlet 106 at the upstream end to three split passages adjacent the downstream end, corresponding to a first outlet 108, a second outlet 110, and a third outlet 112. The flow splitter 102 may have exactly three split passages, and exactly three outlets 108, 110, 112. An exterior of the body 104 may also be generally cylindrical.

The inlet 106 may have a first inner diameter that is approximately equal to an inner diameter of the passage through the body 104. The outlets 108, 110, 112 may have a common second inner diameter that is smaller than the first inner diameter. The sizes of the inlet and outlet diameters may be selected such that the flow velocity in the flow splitter 102 does not change significantly from the inlet 106 to the outlets 108, 110, 112. In some embodiments, the first inner diameter may be from about 10 mm to about 50 mm, and the second inner diameters may be from about 5 mm to about 40 mm. For example, the first inner diameter may be about 38 mm, and the second inner diameters may be about 32 mm.

As best seen in FIG. 2, the first and second split passages are oriented along axes that intersect one another at a first acute angle in a common plane with a longitudinal axis 202 of the flow splitter 102 (i.e., the axis along which the main passage in the flow splitter 102 is oriented). The center axes of the first and outlet split passages may form the first acute angle 204. The first acute angle 204 may be any selected angle, such as between about 5° and 89°, between about 20° and 70°, or between about 30° and 60°. In some embodiments, the first acute angle 204 may be about 40°, about 45°, or about 50°.

As best seen in FIG. 3, the third split passage is oriented outward from the common plane of the first and second split passages and the longitudinal axis 202. The third split passage and the common plane (which is perpendicular to the page in FIG. 3 and including the longitudinal axis 202) form a second acute angle 302 (i.e., center axis of the third split passage and the longitudinal axis 202 may form the second acute angle 302). The second acute angle 302 may be any selected angle, such as between about 5° and 89°, between about 20° and 70°, or between about 30° and 60°. In some embodiments, the second acute angle 302 may be about 35°, about 38°, about 40°, about 42°, about 45°, or about 50°. The second acute angle 302 may be the same or different than the first acute angle 204. The second acute angle 302 may optionally be upstream of the first acute angle, such that material flowing from the inlet 106 through the main passage first reaches the point where the third split passage intersects the main passage before reaching the point where the first and second split passages intersect the main passage. The third outlet 112 may be angled at an acute angle from the third split passage as desired to direct the flow of material where needed.

The angles 204, 302 may be selected such that solid material propelled through the flow splitter 102 by air may flow in approximately equal amounts to each of the first outlet 108, the second outlet 110, and the third outlet 112.

The body 104 of the flow splitter 102 may be made of any selected material, such a metal (e.g., aluminum, stainless steel, etc.), a polymer, etc. The body 104 may be a unitary part, and may be formed by injection molding, machining, etc. In some embodiments, the body 104 may be in the form of two or more parts secured together (e.g., one part forming the portion of the body 104 below the common plane referenced above, and another part forming the portion of the 104 above the common plane).

The flow splitter 102 may be used to deliver solid material, such as seed, fertilizer, etc., from a central hopper of a planter to multiple row units. Use of the flow splitter 102 shown and described instead of conventional flow splitters (typically having one inlet and two outlets) may reduce the number of material flow lines needed, as well as the number of flow splitters, for an implement having a given number of row units. Thus, the flow splitter 102 may reduce the total number of parts and the total cost of parts and assembly.

Figure 4:
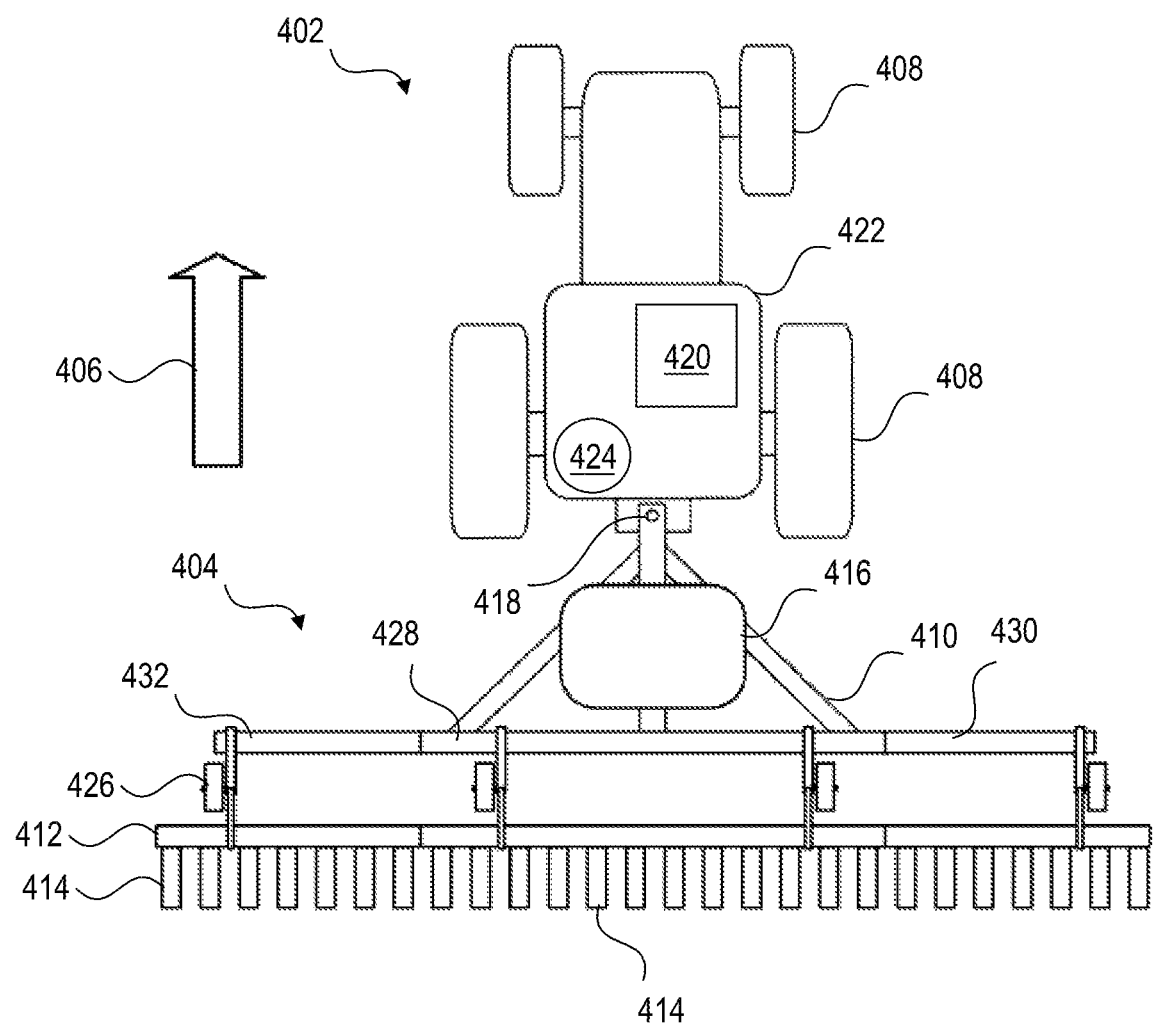
FIG. 4 is a simplified top view of a tractor pulling an implement in accordance with one embodiment.

FIG. 4 illustrates a tractor 402 drawing an agricultural implement 404 in a forward direction 406. The tractor 402 has wheels 408, an engine, a chassis, and other elements as known in the art. The implement 404 has a frame 410 carrying a toolbar 412 supporting row units 414. The row units 414 are connected to a central hopper 416 containing seed to be planted and/or fertilizer to be applied. That is, the row units 414 may be planter and/or fertilizer row units of any design, which are generally known in the art. The implement 404 is connected to the tractor 402 by a tow hitch 418. A computer 420, which may include a central processing unit ("CPU"), memory, implement controller, and graphical user interface ("GUI") (e.g., a touch-screen interface), is typically located in an operator cabin 422 of the tractor 402. A global positioning system GPS receiver 424 may be mounted to the tractor 402 and connected to communicate with the computer 420. The implement controller is configured to communicate with the row units 414 and/or the GPS receiver 424, such as by wired or wireless communication.

The implement 404 may be supported in the field by at least one wheel 426 coupled to the frame 410. The frame 410 may include a first section 428 (e.g., a center section) configured to be towed by the tractor 402, and one or more wing sections 430, 432 hingedly coupled to the first section 428. For example, and as shown in FIG. 4, the first section 428 may be a center section, and two wing sections 430, 432 may be attached to opposite sides thereof. The wing sections 430, 432 may fold for transport or storage, and unfold (as shown in FIG. 4) for planting, fertilizing, or other field operations. Typically, the wheels 426 may support any or all of the wing sections 430, 432. In other embodiments, the center section 428 may be omitted, and two wing sections 430, 432 may be connected directly to one another.

Figure 5:
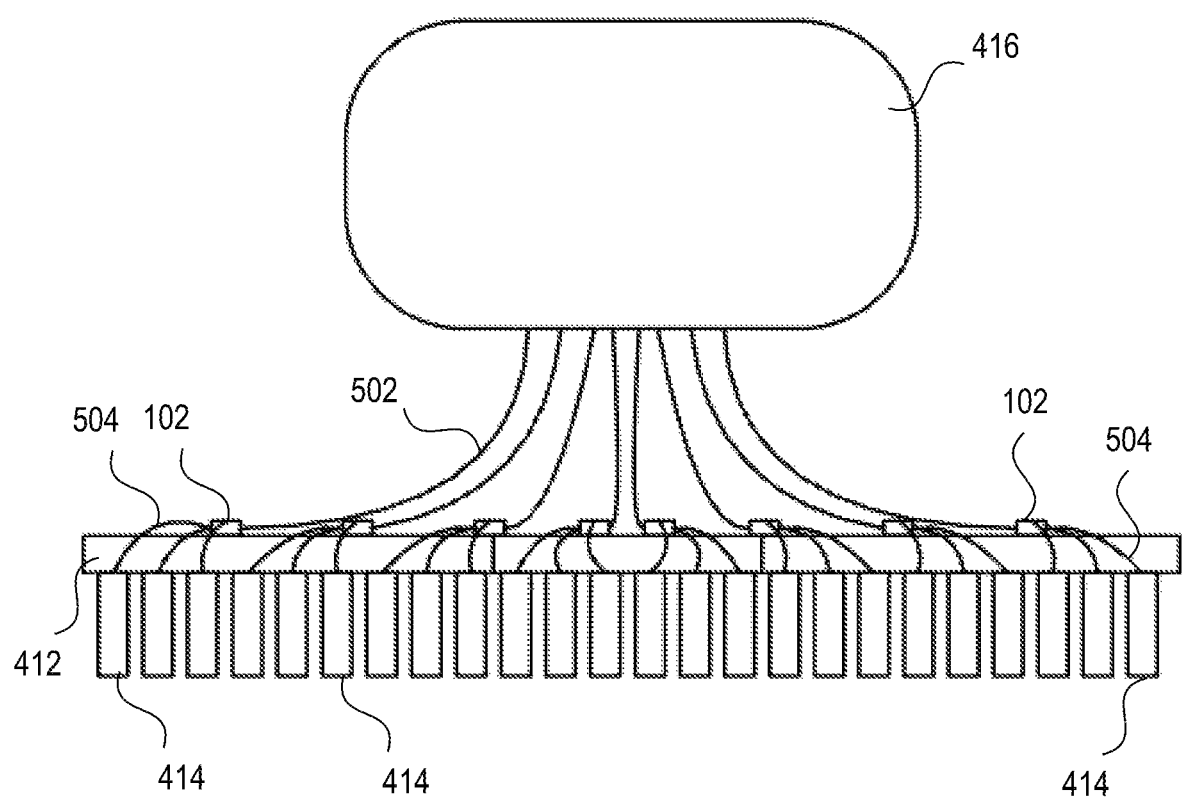
FIG. 5 is a simplified view showing flow lines as used in the implement shown in FIG. 4.

FIG. 5 is a simplified view illustrating the hopper 416 and the row units 414, along with flow lines connecting the hopper 416 to the row units 414 for material transfer. FIG. 5 also illustrates the toolbar 412, but other elements shown in FIG. 4 have been omitted for clarity. Primary flow lines 502 connect from the hopper 416 to flow splitters 102 (one flow splitter 102 per primary flow line 502). The flow splitters 102 may be mounted to the toolbar 412, to one of the row units 414, or any other appropriate location. Secondary flow lines 504 connect each flow splitter 102 to three row units 414. Each row unit 414 may have its own mini-hopper to contain seeds or other material, as known in the art and not shown in detail herein. A pressurized air supply drives solid material from the hopper 416 to the row units 414. By splitting the flow into three lines near the row units 414 (e.g., on each wing section 430, 432), the number of primary flow lines 502 is lower than it would be if each row unit 414 were fed by a dedicated line. Furthermore, because the flow splitter 102 can feed three primary flow lines 502 and three hoppers 416, fewer flow splitters and fewer primary flow lines 502 are needed than would be required if conventional "Y" or "T" flow splitters were used.

FIG. 5 depicts 24 row units 414, which are fed by 8 primary flow lines 502, 8 flow splitters 102, and 24 secondary flow lines 504. If conventional "Y" or "T" flow splitters were used, 12 primary flow lines, 12 flow splitters, and 24 secondary flow lines would be required to feed the 24 row units. FIG. 5 is only illustrative, and the flow splitters 102 may be used with agricultural implements having any number of row units 414.

The flow splitters 102 may each be secured to the implement 404 such that the third outlet 112 is oriented upward, and the common plane formed by the first outlet 108 and the second outlet 110 is oriented at and an angle of about 45° relative to the ground surface, but may be at any other selected orientation. Thus, material flowing through the flow splitters 102 travels either horizontally (through the first outlet 108 and the second outlet 110) or horizontally plus vertically upward (through the third outlet 112).

The flow system described herein, including the flow splitters 102, may be used to supply seeds, fertilizer, or any other solid material. Furthermore, different sizes of material and different types of seeds may be transported through the flow splitters 102 and delivered to each row unit 414.

Figure 6:
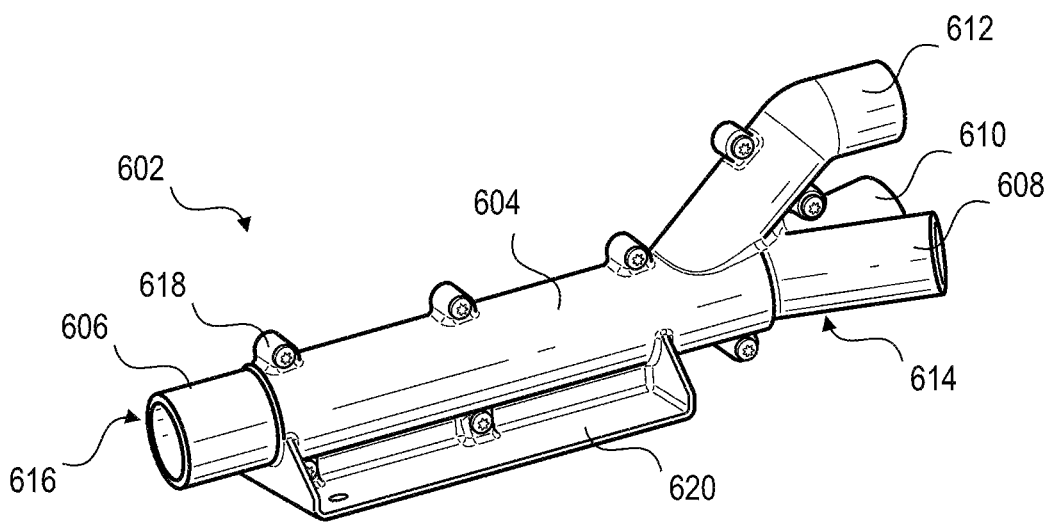
FIG. 6 is a simplified perspective view of another flow splitter.
Figure 7:
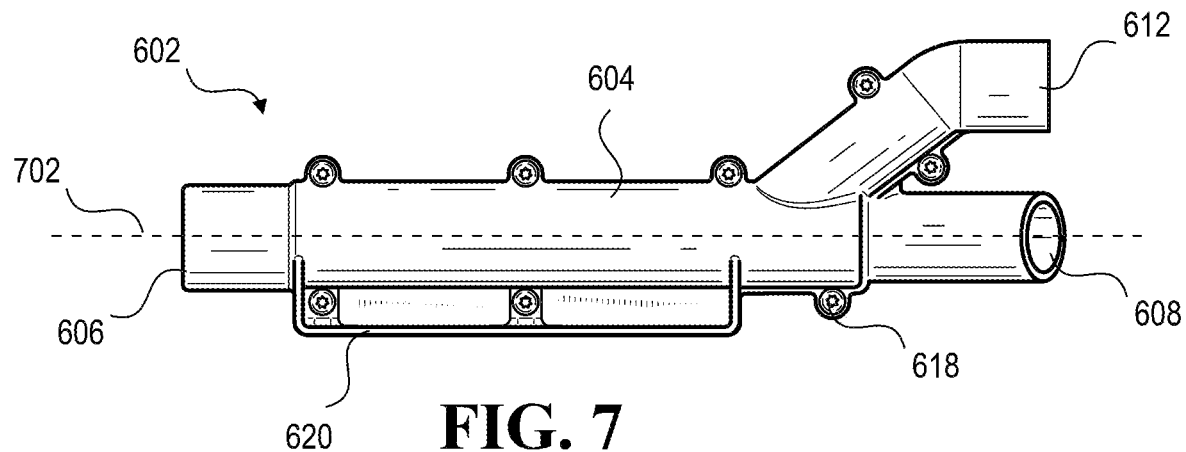
FIG. 7 is a simplified side view of the flow splitter shown in FIG. 6.

FIG. 6 is a simplified perspective view of another flow splitter 602, which has a body 604 defining an inlet 606, a first outlet 608, a second outlet 610, and a third outlet 612. FIG. 7 is a simplified side view of the flow splitter 602. The body 604 may include a first portion 614 and a second portion 616 connected by one or more fasteners 618. The first portion 614 may define the first of the three passages, as well as the first outlet 608. The second portion 616 may define the second of the three passages, as well as the second outlet 610. The first portion 614 and second portion 616 may together define the main passage and the third of the three passages, as well as the inlet 606 and the third outlet 612. The body 604 may have a mount 620, shown in the form of a plate, to secure the body 604 to a toolbar 412.

Figure 8:
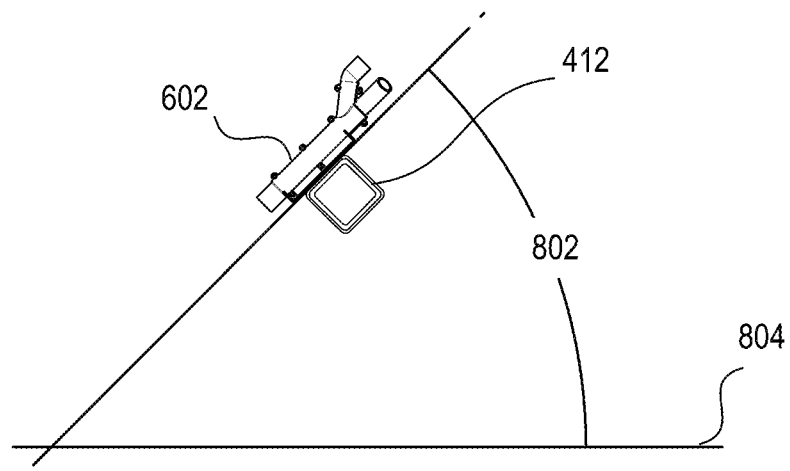
FIG. 8 is a simplified side view showing how the flow splitter of FIG. 6 may be mounted on a toolbar of an agricultural implement.

FIG. 8 is a simplified side view illustrating how the flow splitter 602 may be mounted on the toolbar 412 of an implement 404. For simplicity, the primary flow line 502 and secondary flow lines 504 shown in FIG. 5 are omitted from FIG. 8. In some embodiments, the flow splitter 602 may be bolted to the toolbar 412 such that the longitudinal axis 702 and the common plane of the first outlet 608 and the second outlet 610 of the flow splitter 602 (depicted in FIG. 7 as parallel to the mount 620) are oriented at an angle 802 between about 0° (i.e., parallel) and about 70° relative to a surface of the ground 804 under the implement 404. For example, the angle 802 may be between about 30° and about 60°, such as about 45°.

In such an orientation, flow through each of the outlets 608, 610, 612 may be vertically upward, but may also include a rearward component and a sideways component. That is, the flow through the third outlet 612 may be upward and optionally rearward, whereas the flow through the first outlet 608 and second outlet 610 may each be upward, rearward, and to the left or right.

Figure 9:
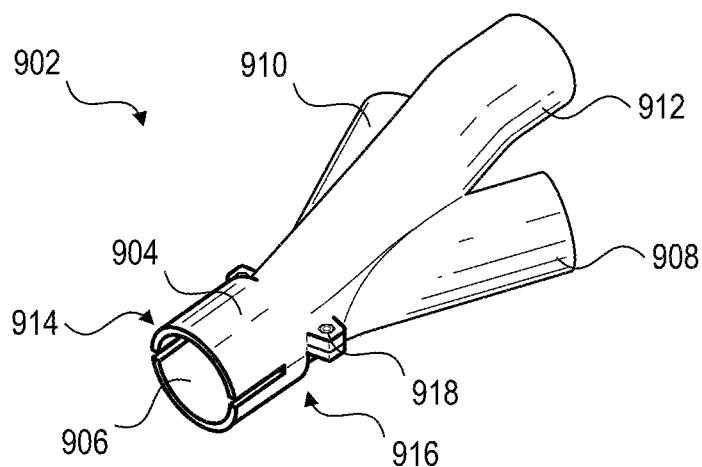
FIG. 9 is a simplified perspective view of another flow splitter.
Figure 10:
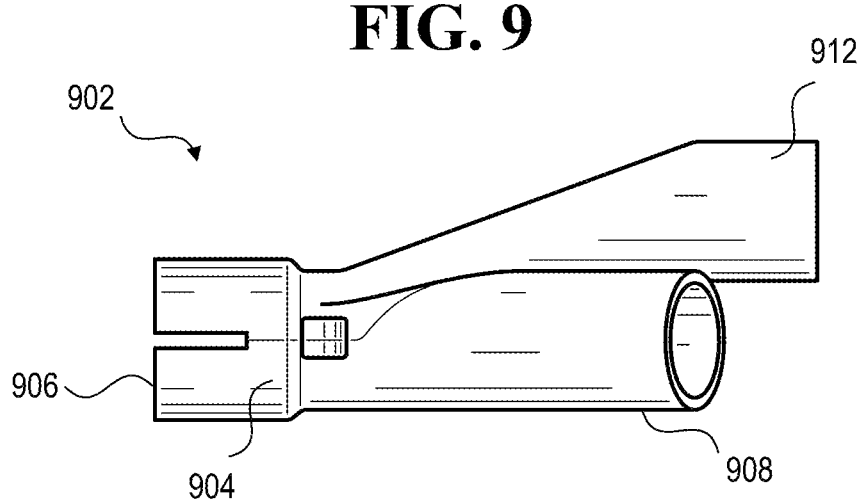
FIG. 10 is a simplified side view of the flow splitter shown in FIG. 9.
Figure 11:
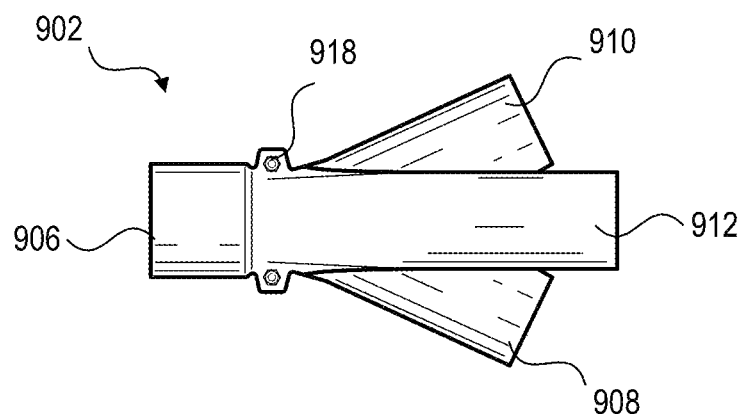
FIG. 11 is a simplified top view of the flow splitter shown in FIG. 9.
Figure 12:
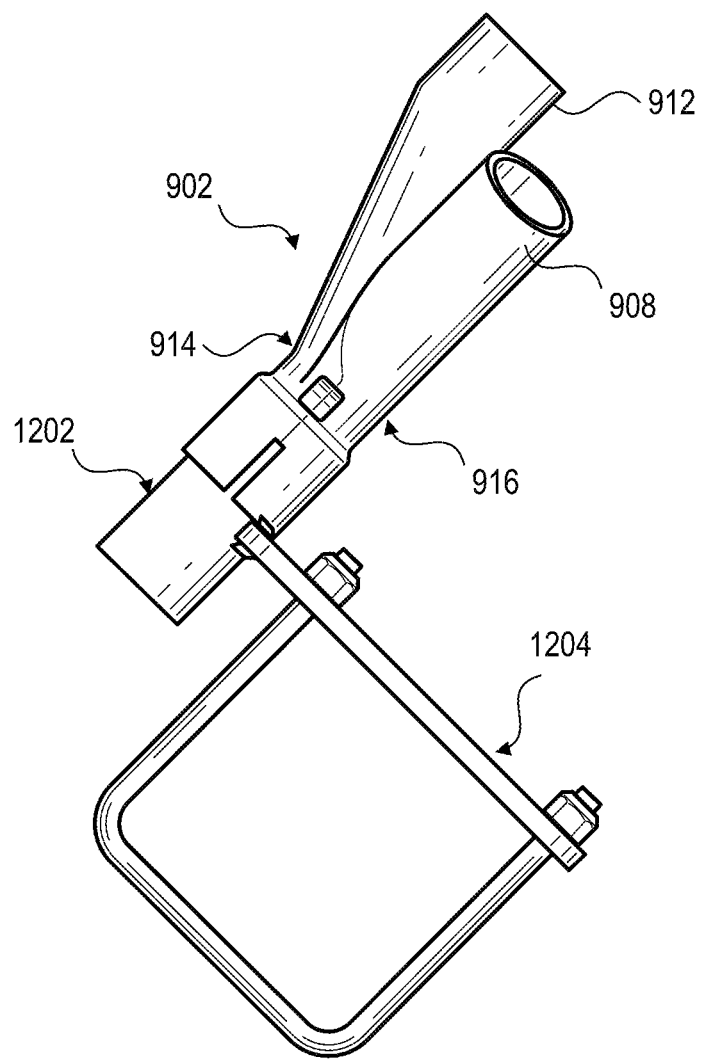
FIG. 12 is a simplified side view of the flow splitter of FIG. 9 secured to a fitting and mount.

FIGS. 9-12 are simplified views showing another embodiment of a flow splitter 902. FIG. 9 shows a perspective view, FIG. 10 shows a side view, and FIG. 11 shows a top view. FIG. 12 shows a side view of the splitter 902 attached to a fitting 1202 and a mount 1204. The splitter 902 has a body 904, which has a generally cylindrical main passage with an upstream end and a downstream end. The main passage connects an inlet 906 at the upstream end to three split passages adjacent the downstream end, corresponding to a first outlet 908, a second outlet 910, and a third outlet 912. The flow splitter 902 may have exactly three split passages, and exactly three outlets 908, 910, 912. The split passages may be arranged with angles as described above with respect to the flow splitter 102.

The body 904 may have a first upper portion 914 and a second lower portion 916 connected by one or more fasteners 918. The upper portion 914 may define the third of the three passages, as well as the third outlet 912. The lower portion 916 may define the first and second of the three passages, as well as the first and second outlets 908, 910. The upper portion 914 and lower portion 916 may together define the main passage, as well as the inlet 906. The shape of the upper portion 914 and lower portion 916 may be selected for ease of manufacturing.

As shown in FIG. 12, the flow splitter 902 may be secured to a fitting 1202, and secured to a planter or other implement (e.g., as in FIG. 4), by a mount 1204. The mount 1204 is shown as a U-clamp to secure to a square toolbar, but other mounting arrangements may also be used. The fitting 1202 may be a hollow tube of approximately the same inner diameter as the main passage of the splitter 902. The fitting

1202 may include an attachment for the mount 1204, such as a welded or cast plate, a screw clamp, a bracket, etc.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope as contemplated by the inventors. Further, embodiments of the disclosure have utility with different and various machine types and configurations.

What is claimed is:

1. A flow splitter, comprising:
   a body having a generally cylindrical main passage therethrough oriented along a longitudinal axis of the body, the body having an upstream end and a downstream end, wherein the upstream end and downstream end are at opposing ends of the flow splitter wherein:
      the main passage connects an inlet at the upstream end to exactly three split passages at the downstream end, each split passage connected to a corresponding outlet;
      a first and second of the three split passages are oriented along axes that intersect one another at a first acute angle in a common plane with the longitudinal axis; and
      a third of the three split passages intersects the common plane at a second acute angle.

2. The flow splitter of claim 1, wherein the inlet has a first inner diameter, and wherein each of the outlets has a common second inner diameter, the second inner diameter smaller than the first inner diameter.

3. The flow splitter of claim 1, wherein the first acute angle is between 5° and 89°.

4. The flow splitter of claim 3, wherein the first acute angle is between 20° and 70°.

5. The flow splitter claim 1, wherein the second acute angle is between 5° and 89°.

6. The flow splitter of claim 5, wherein the second acute angle is between 20° and 70°.

7. The flow splitter of claim 1, wherein the body comprises a first portion and a second portion connected by at least one fastener.

8. The flow splitter of claim 7, wherein the first portion defines the first of the three split passages, the second portion defines the second of the three split passages, and the first portion and the second portion together define the main passage and the third of the three split passages.

9. The flow splitter of claim 7, wherein the first portion defines the third of the three split passages, the second portion defines the first and second of the three split passages, and the first portion and the second portion together define the main passage.

10. The flow splitter of claim 1, further comprising a mount configured to secure the body to a toolbar.

11. An agricultural implement, comprising:
    a frame;
    a toolbar carried by the frame and supporting a plurality of row units;
    a hopper carried by the frame;
    a primary flow line connecting the hopper to a flow splitter, the flow splitter comprising:
       a body having a generally cylindrical main passage therethrough oriented along a longitudinal axis of the body, the body having an upstream end and a downstream end, wherein:
          the main passage connects an inlet at the upstream end to exactly three split passages adjacent the downstream end, each split passage connected to a corresponding outlet;
          a first and second of the three split passages are oriented along axes that intersect one another at a first acute angle in a common plane with the longitudinal axis; and
          a third of the three split passages intersects the common plane at a second acute angle; and
       three secondary flow lines connecting the flow splitter to three row units of the plurality of row units.

12. The agricultural implement of claim 11, wherein the flow splitter is secured to the implement such that the common plane is oriented at an angle between 0° and 70° relative to a surface of ground under the agricultural implement when the implement works the ground.

13. The agricultural implement of claim 12, wherein the common plane is oriented at an angle between 40° and 50° relative to the surface of ground under the agricultural implement when the implement works the ground.

14. The agricultural implement of claim 11, wherein the third outlet is oriented such that material flows vertically upward out of each of the first outlet, the second outlet, and the third outlet.

15. The agricultural implement of claim 11, wherein the frame comprises a first section and at least one wing section hingedly coupled to the first section, wherein the flow splitter is carried by the at least one wing section.

16. The agricultural implement of claim 11, wherein the toolbar is supported by at least one wheel.

17. The agricultural implement of claim 11, wherein each of the row units is configured to receive solid material from the hopper and dispense the solid material to an agricultural field.

18. The agricultural implement of claim 11, wherein each of the row units comprises a planter row unit.

19. The agricultural implement of claim 11, wherein each of the row units comprises a fertilizer row unit.

* * * * *